(12) United States Patent
Jagtiani

(10) Patent No.: US 11,138,178 B2
(45) Date of Patent: Oct. 5, 2021

(54) SEPARATION OF COMPUTATION FROM STORAGE IN DATABASE FOR BETTER ELASTICITY

(71) Applicant: Futurewei Technologies, Inc., Plano, TX (US)

(72) Inventor: Kamini Jagtiani, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1210 days.

(21) Appl. No.: 15/348,527

(22) Filed: Nov. 10, 2016

(65) Prior Publication Data

US 2018/0129692 A1    May 10, 2018

(51) Int. Cl.
*G06F 16/23*    (2019.01)
*G06F 16/22*    (2019.01)
*G06F 16/2453*    (2019.01)

(52) U.S. Cl.
CPC .............. *G06F 16/23* (2019.01); *G06F 16/22* (2019.01); *G06F 16/24534* (2019.01)

(58) Field of Classification Search
CPC ..... G06F 16/23; G06F 16/22; G06F 16/24534
See application file for complete search history.

(56) References Cited

U.S. PATENT DOCUMENTS

| 6,049,853 A | 4/2000 | Kingsbury et al. |
| 6,438,652 B1 * | 8/2002 | Jordan .................... G06F 9/505 711/120 |
| 7,054,931 B1 * | 5/2006 | Candan ............... H04L 67/1008 709/203 |
| 7,779,010 B2 * | 8/2010 | McGarvey ............ G06F 16/278 707/737 |
| 8,799,284 B2 | 8/2014 | Jagtiani et al. |
| 9,239,741 B2 | 1/2016 | Dai et al. |

(Continued)

FOREIGN PATENT DOCUMENTS

| CN | 1685320 A | 10/2005 |
| CN | 101594377 A | 12/2009 |

(Continued)

OTHER PUBLICATIONS

Hwang, "Adaptive Performance-Aware Distributed Memory Caching", George Washington University (Year: 2013).*

(Continued)

*Primary Examiner* — Mahesh H Dwivedi
*Assistant Examiner* — Huen Wong
(74) *Attorney, Agent, or Firm* — Vierra Magen Marcus LLP

(57) ABSTRACT

A device such as a data storage system comprises a non-transitory memory storage comprising instructions, and one or more processors in communication with the memory. The one or more processors execute the instructions to: map a different portion of data in a storage device to each of different caches, wherein each cache is in a computing node with a processor; change a number of the computing nodes; provide a modified mapping in response to the change; and pass queries to the computing nodes. The computing nodes can continue to operate uninterrupted while the number of computing nodes is changed. Data transfer between the nodes can also be avoided.

23 Claims, 11 Drawing Sheets

(56) References Cited

U.S. PATENT DOCUMENTS

| | | | |
|---|---|---|---|
| 2002/0174379 A1* | 11/2002 | Korenevsky | G06F 11/1461 714/19 |
| 2007/0156724 A1* | 7/2007 | Kostamaa | G06F 16/2471 |
| 2009/0083341 A1* | 3/2009 | Parees | G06F 16/2365 |
| 2009/0144344 A1* | 6/2009 | McBride | G06F 16/27 |
| 2009/0240664 A1 | 9/2009 | Dinker et al. | |
| 2009/0240869 A1 | 9/2009 | O'Krafka et al. | |
| 2011/0137971 A1* | 6/2011 | Horii | H04L 12/1854 709/201 |
| 2011/0289049 A1* | 11/2011 | Zeng | G06F 16/22 707/611 |
| 2012/0143823 A1* | 6/2012 | Jain | G06F 16/278 707/640 |
| 2013/0311426 A1* | 11/2013 | Erdogan | G06F 16/27 707/610 |
| 2013/0346693 A1 | 12/2013 | Zhang | |
| 2014/0122510 A1 | 5/2014 | Namkoong et al. | |
| 2014/0129667 A1* | 5/2014 | Ozawa | H04W 4/18 709/213 |
| 2014/0258266 A1 | 9/2014 | Cruanes et al. | |
| 2014/0280276 A1* | 9/2014 | Prasanna | G06F 16/278 707/758 |
| 2014/0330785 A1* | 11/2014 | Isherwood | G06F 11/1446 707/640 |
| 2015/0006482 A1* | 1/2015 | Hardy | G06F 16/2365 707/613 |
| 2015/0074150 A1* | 3/2015 | Kapur | G06F 16/278 707/803 |
| 2015/0269239 A1* | 9/2015 | Swift | G06F 16/27 707/610 |
| 2016/0026684 A1 | 1/2016 | Mukherjee et al. | |
| 2016/0070501 A1* | 3/2016 | Lomnes | G06F 21/80 711/162 |
| 2016/0110391 A1* | 4/2016 | Korycki | G06F 16/2228 707/741 |
| 2016/0171072 A1 | 6/2016 | Jagtiani et al. | |
| 2016/0253386 A1 | 9/2016 | Burns | |
| 2016/0350392 A1* | 12/2016 | Rice | G06F 16/27 |
| 2017/0103098 A1* | 4/2017 | Hu | G06F 16/2471 |
| 2017/0277590 A1* | 9/2017 | Luse | G06F 3/064 |

FOREIGN PATENT DOCUMENTS

| | | | |
|---|---|---|---|
| CN | 102591970 A | 7/2012 | |
| CN | 103038755 A | 4/2013 | |
| CN | 103810244 A | 5/2014 | |
| CN | 103905503 A | 7/2014 | |

OTHER PUBLICATIONS

Herrero, "Elastic cooperative caching: an autonomous dynamically adaptive memory hierarchy for chip multiprocessors", Proceedings of the 37th annual international symposium on Computer architecture (Year: 2010).*

PCT/CN2016/106814, ISR, dated Jul. 28, 2017.

Amazon Redshift, "Data Warehouse System Architecture," downloaded from http://docs.aws.amazon.com/redshift/latest/dg/c_high_level_system_architecture.html on Sep. 7, 2016, 3 pages.

Wikipedia, "Snowflake Computing," downloaded from https://en.wikipedia.org/wiki/Snowflake_Computing on Sep. 7, 2016, 2 pages.

Microsoft Azure, "SQL Data Warehouse," downloaded from https://azure.microsoft.com/en-us/services/sql-data-warehouse/ on Sep. 7, 2016, 9 pages.

Chinese Office Action dated Jul. 3, 2020, Chinese Patent Application No. 201680090728.5.

Sandro Bartolini et al, Feedback-driven Restructuring of Multithreaded Applications for NUCA Cache Performance in CMPs, 2010 22nd International Symposium on Computer Architecture and High Performance Computing, 8 pages.

Shen Zhiqiang, Key Technology of Network Cache in Cloud Storage System, Apr. 2016, 2 pages.

Notice of Allowance dated Jun. 29, 2021, Chinese Patent Application No. 201680090728.5.

* cited by examiner

|  | Name_col(1) | Name_col(2) | Name_col(3) ... | Name_col(x) |
|---|---|---|---|---|
| Name_row(1) | field (1,1) | field(1,2) | field(1,3) | field(1,x) |
| Name_row(2) | field (2,1) | field(2,2) | field(2,3) | field(2,x) |
| ... | | | | |
| Name_row(y) | field (y,1) | field(y,2) | field(y,3) | field(y,x) |

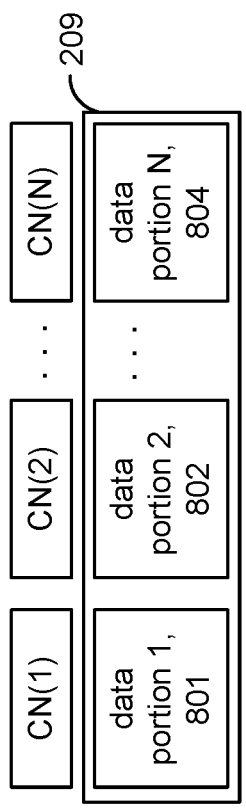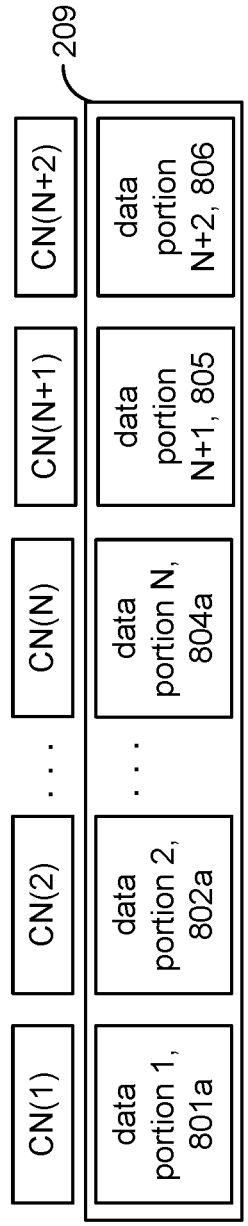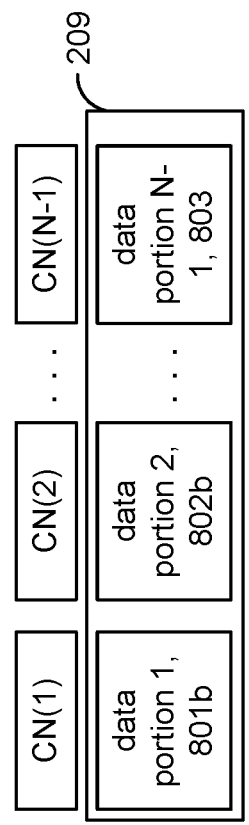

SEPARATION OF COMPUTATION FROM STORAGE IN DATABASE FOR BETTER ELASTICITY

BACKGROUND

Database architectures support business, government and consumer users, among others, by storing and providing access to data. Typically, the architecture allows a substantial amount of data to be quickly accessed by many users. The data may be stored in various storage media such as hard disk drives and accessed by servers. The servers are connected to a network such as the internet to provide data to user devices such as cell phones, laptops and personal computers or other client devices. In some cases, the servers and storage media provide parallel processing of user requests.

BRIEF SUMMARY

Embodiment 1 is direct to a device comprising a non-transitory memory storage comprising instructions, and one or more processors in communication with the memory, wherein the one or more processors execute the instructions to: map a different portion of data in a storage device to each of different caches, wherein each cache is in a computing node with a processor, change a number of the computing nodes, provide a modified mapping in response to the change, and pass queries to the computing nodes.

Embodiment 2 is directed to embodiment 1, wherein the storage device comprises a hard disk drive, and the one or more processors execute the instructions to change a mounting of partitions of the hard disk drive to the caches to modify the mapping.

Embodiment 3 is directed to embodiment 1 or 2, wherein the one or more processors execute the instructions to use consistent hashing to modify the mapping.

Embodiment 4 is directed to any of embodiments 1 to 3, wherein the one or more processors execute the instructions to modify the mapping without transferring data between the caches.

Embodiment 5 is directed to any of embodiments 1 to 4, wherein the data in the storage device is in rows of a table, different rows of data are mapped to different caches, and the modified mapping changes a number of the rows which is mapped to each of the caches.

Embodiment 6 is directed to any of embodiments 1 to 5, wherein the one or more processors execute the instructions to cause a row of data which is no longer mapped to a cache in a computing node due to the modified mapping to remain in the cache until it is deleted by a least recently used algorithm.

Embodiment 7 is directed to any of embodiments 1 to 6, wherein the one or more processors execute the instructions to, for each computing node, create a table in the cache, the table comprises column names and is initially empty, and in response to a query to the computing node, load into the table in the cache, from the storage device, one or more rows of data which are mapped to the cache and which are needed to respond to the query.

Embodiment 8 is directed to any of embodiments 1 to 7, wherein the one or more processors execute the instructions to, for each computing node, create a table in the cache, and in response to a query to the processor, load into the table in the cache, from the storage device, data which is mapped to the cache and which is needed to respond to the query without loading in data into the table from the storage device which is mapped to the cache and which is not needed to respond to the query.

Embodiment 9 is directed to any of embodiments 1 to 8, wherein the one or more processors execute the instructions to copy data from the storage device which has been mapped to the cache into the cache if the data is not already in the cache and is needed to respond to a query, for each computing node.

Embodiment 10 is directed to any of embodiments 1 to 9, wherein common portions of the data are not mapped to different caches.

Embodiment 11 is directed to any of embodiments 1 to 10, wherein the one or more processors execute the instructions to determine a portion of the data which is in relatively high demand and map the portion of the data which is in relatively high demand to multiple caches.

Embodiment 12 is directed to any of embodiments 1 to 11, wherein the one or more processors execute the instructions to modify data in the cache to provide modified data, and to write the modified data to the storage device, for each computing node.

Embodiment 13 is directed to any of embodiments 1 to 12, wherein the one or more processors execute the instructions to modify the mapping based on response times for replies to the queries provided by the computing nodes.

Embodiment 14 is directed to any of embodiments 1 to 13, wherein the one or more processors execute the instructions to provide an initial data load into the storage device via the computing nodes, and the computing nodes are configured to write data from the initial data load to the storage device.

Embodiment 15 is directed to any of embodiments 1 to 14, wherein the one or more processors execute the instructions to provide an initial data load into the storage device which bypasses the computing nodes.

Embodiment 16 is directed to a computer-implemented method for accessing data comprising: with one or more processors, mapping a portion of table data to each computing node of a number N computing nodes, and creating a table in each of the N computing nodes. The method further includes, at each of the N computing nodes, populating the table in response to a query by copying data which is mapped to the computing node from a storage device. The method further includes, in response to an increasing load, using an additional M computing nodes to access the data of the storage device, mapping a portion of the table data to each computing node of the N+M computing nodes, creating a table in each of the M computing nodes, and at each of the M computing nodes, populating the table in response to a query by copying data which is mapped to the computing node from the storage device.

Embodiment 17 is directed to embodiment 16, wherein the table data comprises rows of data, and the portion of the table data which is mapped to each computing nodes comprises one or more rows of the table data.

Embodiment 18 is directed to embodiment 16 or 17, wherein the method further comprising, with the one or more processors: for at least one of the N computing nodes, using a SQL INSERT INTO SELECT statement for the copying of the data which is mapped to the computing node from the storage device.

Embodiment 19 is directed to a non-transitory computer-readable medium which stores computer instructions for accessing data, that when executed by one or more processors, cause the one or more processors to perform the steps of: identifying a computing node which is configured to respond to a query, based on a mapping of data of a storage device to computing nodes, wherein the mapping is time-varying based on a time-varying number of the computer nodes. The steps further include communicating the query to the computing node, and receiving a reply to the query from the computing node. The computing node provides the reply using the data mapped to the computing node, and the data mapped to the computing node is copied to the computing node from the storage device.

Embodiment 20 is directed to embodiment 19, wherein a number of rows mapped to each computing node is time-varying based on the time-varying number of computer nodes.

Embodiment 21 is directed to embodiment 19 or 20, wherein the time-varying number of computer nodes is based on a time-varying load.

Embodiment 22 is directed to any of embodiments 19 to 21, the computer instructions for accessing data, when executed by one or more processors, cause the one or more processors to perform the further step of: shutting off the computing nodes and subsequently powering on the computing nodes while data which is mapped to the computing nodes remains in the computing nodes.

BRIEF DESCRIPTION OF THE DRAWINGS

Aspects of the present disclosure are illustrated by way of example and are not limited by the accompanying figures for which like references indicate elements.

FIG. 8A depicts an example of mapping data of a storage device to N computing nodes, consistent with step 303 of FIG. 3A and step 361 of FIG. 3B.

FIG. 8B depicts an example of mapping data of a storage device to N+2 computing nodes, consistent with step 507 of FIG. 5.

FIG. 8C depicts an example of mapping data of a storage device to N−1 computing nodes, consistent with step 507 of FIG. 5.

FIG. 9A depicts an example implementation of the mapping of FIG. 8A.

FIG. 9B depicts an example implementation of the mapping of FIG. 8B.

FIG. 9C depicts an example implementation of the mapping of FIG. 8C.

DETAILED DESCRIPTION

Figure 1:
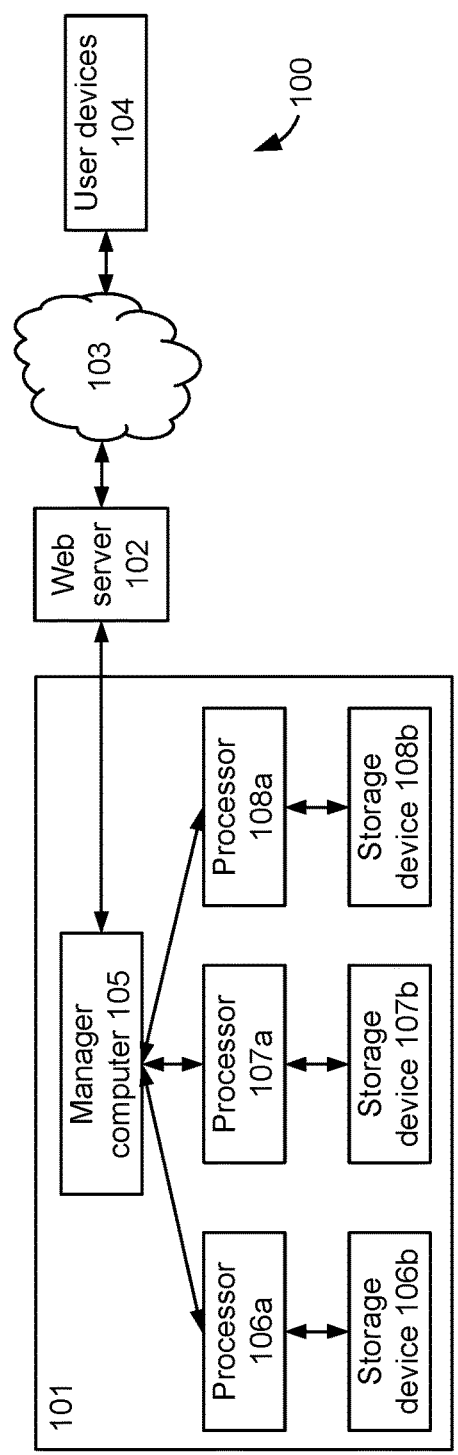
FIG. 1 depicts an example network for accessing data, in which processors are paired with separate storage devices.

The disclosure relates to a device such as a data storage system and an associated method for accessing data.

A data storage system provides parallel processing of user requests to improve efficiency and response time. For example, a massively parallel processing database (MPPDB) architecture provides coordinated processing of a program by multiple processors or multiple computing nodes, where the multiple processors or multiple computing nodes work on different parts of the program. This approach brings the computations very close to the data so the processing of queries can be very efficient if the queries are properly allocated among the computing nodes.

Data storage systems may be cloud-based. For example, Database as a Service (DBaaS) is a cloud-based approach to the storage and management of structured data. DBaaS delivers database functionality similar to what is found in relational database management systems (RDBMSes) such as SQL Server, MySQL and Oracle.

While the MPPDB architecture is effective, elasticity may be inadequate. Elasticity is important for cloud-native databases, among others, and refers to the ability to add or remove computation and storage resources separately and very quickly. However, with some data storage architectures, a significant amount of data needs to be redistributed among the storage resources when a computing node is added or removed. During the redistribution, the computing nodes are unavailable to respond to queries, resulting in delayed responses to the queries. Each computing node has processing and storage resources and a group of computing nodes may be arranged in a cluster.

Techniques provided herein address the above and other issues by separating computation devices from storage devices. In one approach, a MPPDB is provided which includes a number of computing nodes. Each computing node has one or more processors and associated cache storage. In one approach, the cache storage is mounted to the processor, as a form of mountable storage. One implementation of the cache storage uses the Elastic Volume Service of HUAWEI Technologies Co., Ltd. Mounting refers to making a storage medium accessible to a computer's file system. When the storage medium is successfully mounted, the computer incorporates the file system of the medium into a local file system. Further, a mount point is created, which is a locally available link through which the medium is accessed as an external device.

The computing nodes are used to access a common storage device, which may be referred to as an object store. The storage device stores one or more files, such as a table which is accessed using Structured Query Langauge (SQL) commands. In one approach, the file is transferred to the storage device from a loading device using a RESTful API. REST denotes Representational State Transfer and API denotes Application Programming Interface. A RESTful system can communicate over Hypertext Transfer Protocol (HTTP) with the same HTTP commands (e.g., GET, POST, PUT, DELETE) that web browsers use to retrieve web pages and to send data to remote servers.

A different portion of the data in the storage device is mapped to each cache. For example, a different set of rows can be mapped to each different cache. In one approach, a table is created in each cache which has the same column names and column data types as the table in the storage device but the table is unpopulated. A schema, or organizational structure for a database, may be provided. The rows of the table may be populated by copying in data from the storage device when the data is needed by the computing node to respond to a query. Eventually, all of the rows of the table in each cache may be populated.

In some cases, a computing node may change the data, in which case the storage device is updated by writing the modified data back to it.

A computing manager maintains meta data which indicates a mapping of the different portions of the data in the storage device to each cache or computing node. The mapping is modified when computing nodes are added or removed. A newly added computing node will copy in data from the storage device as it is needed to respond to a query. Data which is stored at a cache but which is no longer mapped to the cache can remain there until it is deleted using a least recently used (LRU) algorithm. Data which is stored at a cache and which is still mapped to the cache can also remain there until it is deleted using an LRU algorithm. Also, data which is newly mapped to a cache need not be copied in until it is needed to respond to a query. As a result, the change in the number of computing nodes can be made without a disruptive transfer of data between nodes which would result in a temporary unavailability of the computing nodes and a delay in responding to queries.

Consistent hashing can be used to modify the mapping of data of the storage device to the computing nodes. Consistent hashing maps data to the same cache, as far as possible, to minimize the reassignment of data. When a cache is added, it takes its share of data from all the other caches. When a cache is removed, its data is shared among the remaining caches.

The techniques described herein can use cache storage mediums having a relatively high access speed, to provide a quick reply to queries. A main storage device, separate from the cache, can use a storage medium which has a relatively low access speed for cost savings.

Further, the computing nodes can be temporarily shut down and quickly powered up with data intact with the use of non-volatile memory for the caches. There is no need for backing up the data to a backup storage medium before the shutdown, or before loading in the data from the backup storage medium during the power up.

The techniques provided herein can save money for users of DBaaS since they only have to pay for an amount of service which is matched to their current needs.

A device and method for accessing data are provided. A device includes a plurality of computing nodes, where each computing node includes a processor and a cache. The computing nodes are used to access a storage device with the help of a manager computer. The manager computer comprises mapping data which maps a different portion of the data in the storage device to each of the caches. The number of computing nodes can be easily changed to meet a current load on the device. The mapping changes as the number of nodes changes. Moreover, the transfer of data between caches can be avoided so that the processing of the device continues uninterrupted.

A method for accessing data includes providing an initial data load of table data to a storage device, mapping a portion of the table data to each computing node of a number N computing nodes, and creating a table in each of the N computing nodes. Subsequently, the method includes populating the table in response to a query by copying data which is mapped to the computing node from the storage device. Further, in response to an increasing load, M new computing nodes are used. The table data is remapped to all of the nodes, while a table is created in each of the new computing nodes. The tables in the new computing nodes are subsequently populated in response to a query by copying data which is mapped to the new computing node from the storage device.

Another method for accessing data includes receiving a request comprising a query, identifying a computing node which is configured to respond to the query, based on a mapping of data, communicating the query to the computing node, receiving a reply to the query from the computing node, and providing a response to the request based on the reply. The mapping is time-varying based on a time-varying number of computer nodes.

FIG. 1 depicts an example network 100 for accessing data, in which processors are paired with separate storage devices. The network includes a data storage system 101, a web server 102, a network 103 such as the internet and one or more user computing devices 104 such as cell phones, laptops, or personal computers, for example. Another example of a user computing device is an analytic server which accesses the data storage system, such as to perform a big data analysis. The data storage system 101 includes a manager computer 105 which receives requests from the web server, communicates queries of the request to different processors 106*a*, 107*a* and 108*a*, receives replies from the processors, and communicates a corresponding response to the web server, in one approach. The processors 106*a*, 107*a* and 108*a* access data in storage devices 106*b*, 107*b* and 108*b*, respectively. Since the processors access data from separate storage devices, it is not easy to add or remove storage devices to meet a current load on the data storage system. For example, data would have to be transferred to a newly added storage device from one or more of the existing storage devices, rendering the one or more existing storage devices temporarily unavailable to the respective processor.

In one approach, the processors 106*a*-108*a* communicate with the storage devices using network calls each time the data is accessed to the data is needed. This results in a large number of networks calls which also reduces response time. The networks described below overcome the above-mentioned issues.

Figure 2A:
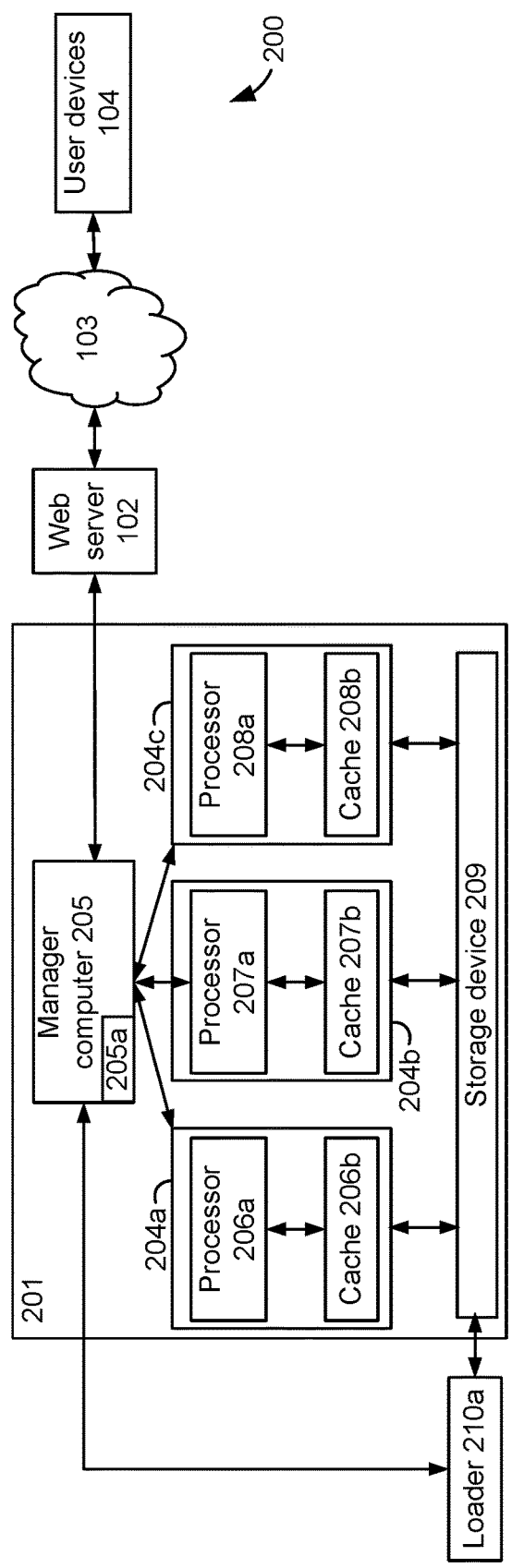
FIG. 2A is a diagram of a network for accessing data according to an embodiment.

FIG. 2A is a diagram of a network 200 for accessing data according to an embodiment. The network includes a web server 102, a network 103, and user computing devices 104. A data storage system 201 is in communication with the web server 102. The web server 102 is further in communication with the network 103. User computer devices 104 may also be in communication with the network 103. The data storage system 201 can communicate with and interact with the user computer devices 104 via the network 103. The data storage system 201 communicates with and interacts with the web server 102 and therefore can interact with the network 103 and devices or systems coupled to the network, such as the one or more user computing devices 104.

The data storage system 201 includes a manager computer 205 coupled to one or more computing nodes 204*a*-204*c*. The manager computer 205 monitors and facilitates the provision of data to the one or more computing nodes 204*a*-204*c*. The manager computer 205 also includes mapping data 205*a* (or map), discussed further below. The computing nodes 204*a*-204*c* include processors 206*a*-208*a* and corresponding caches 206*b*-208*b*, wherein the processors 206*a*-208*a* are paired with the caches 206*b*-208*b*, respectively. The one or more computing nodes 204*a*-204*c* are coupled to a common storage device 209 within the data storage system 201. The computing nodes access the common storage device 209. A loader 210a is in communication with the storage device 209. The loader 210a can be external to the data storage system 201, as shown, or optionally can be within the data storage system 201. The loader 210a can be used for directly loading initial data into the storage device 209.

The manager computer 205 receives requests from the web server 102, communicates queries of the request to different processors 206a-208a, receives replies from the processors 206a-208a, and communicates a corresponding response to the web server 102, in one approach. The processors 206a, 207a and 208a access data in caches 206b, 207b and 208b, respectively. Portions of the data in the common storage device 209 are mapped to different caches according to the mapping data 205a. In one approach, common portions of the data are not mapped to different caches.

In another approach, data which is frequently accessed can be mapped to multiple caches to improve its availability. The manager computer 205 is configured to determine a portion of the data which is in relatively high demand and map the portion of the data which is in relatively high demand to multiple caches.

Since the processors 206a-208a access data from a common storage device, it is easy to add or remove computing nodes by changing the mapping of the data. Data does not have to be transferred among the caches when a cache is added or removed. Moreover, in one approach, the caches are mounted to the processors so that they can be quickly accessed without making a network call. A network call may be made from the cache to the storage device to copy in data to the cache, in some implementations. The number of networks calls is still less than in the network of FIG. 1.

A loader 210a, e.g., a computing device, can be used to directly load initial data to the storage device 209. This approach allows the data to be loaded quickly because it does not pass through the manager computer 205, processors 206a-208a, or caches 206b-208b. A disadvantage is that some time is used when the data (which is allocated to the caches) is copied separately from the storage device 209. However, this copying can occur on an as-needed basis over time in response to queries. In another option shown in FIG. 2B, a loader 210b loads in the initial data to the storage device via the manager computer, processors and caches, in an indirect loading process. A disadvantage is that this loading is more time-consuming than the direct loading. An advantage is that the data is fully loaded in the caches when the data storage system begins handling queries so that the caches do not have to copy data from the storage device to respond to queries.

Figure 2B:
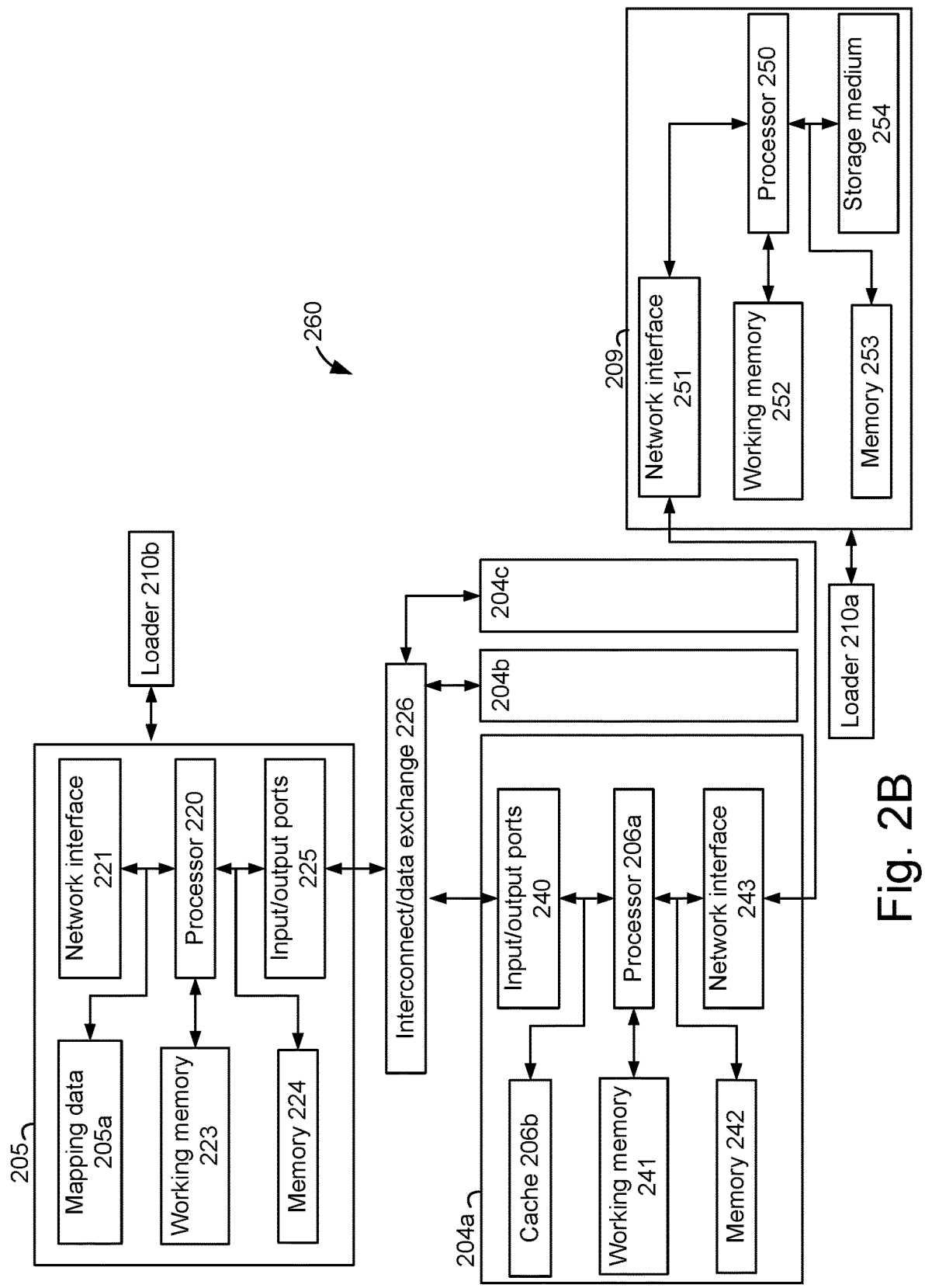
FIG. 2B is another example of the network of FIG. 2A according to an embodiment.

FIG. 2B is another example of the network of FIG. 2A according to an embodiment. Details of the manager computer 205, web server 102, computing node 204a and storage device 209 are depicted. Only one computing node 204a is depicted in detail in this example, but it should be understood that the network 200 can include any number of computing nodes. In the manager computer 205, a processor 220 communicates with a network interface 221, mapping data 205a, a working memory 223, a memory 224 and input/output ports 225. The mapping data 205a may be in a separate non-volatile storage or may be part of the memory 224. The mapping data 205a describes how portions of the data in the storage device 209 are mapped to different caches or computer nodes 204a-204c.

The input/output ports 225 allow the manager computer 205 to communicate with the computing nodes 204a-204c, such as to send queries, receive replies to the queries, and configure tables in the caches for storing data from the storage device 209. The manager computer 205 can communicate with the computing nodes 204 a-204c via an interconnect/data exchange fabric 226. The network interface 221 allows the manager computer 205 to communicate with the web server 102.

In the computing node 204a, the processor 206a communicates with a network interface 243, a working memory 241, a memory 242, input/output ports 240 and the cache 206b. The cache 206b can be a storage medium such as non-volatile storage, e.g., a solid state memory such as flash memory. The input/output ports 240 allow the computing node 204a to communicate with the manager computer 205 such as to receive queries, send replies to the queries, and receive a configuration of a table for storing data from the storage device 209. The computing node 204a can communicate with the manager computer 205 via the interconnect/data exchange fabric 226. The network interface 243 allows the computing node 204a to communicate with the storage device 209 such as to retrieve data which is mapped to the computing node 204a and which is needed to respond to a query. The computing node 204a may also communicate with the storage device 209 to write modified data to it. The configuration of the other computing nodes 204b and 204c can be similar to computing node 204a. In some cases, the computing nodes 204a-204c can have different capabilities such as different cache sizes, cache storage mediums, or processor speeds. Or, the computing nodes 204a-204c can have uniform capabilities.

In the storage device 209, a processor 250 communicates with a network interface 251, a working memory 252, a memory 253, and a storage medium 254. The storage device 209 includes a storage media or mediums that accept and store data. The storage medium can be, e.g., a hard disk (or disks) or solid state memory. The network interface 251 allows the storage device 209 to communicate with the computing nodes 204a-204c such as to receive requests to retrieve data which is mapped to the computing nodes and which is needed to respond to a query, or to receive modified or new data which is to be written to the storage device 209.

The memories 224, 242 and 253 may be non-volatile storage for code which is loaded into the working memory 223, 241 and 252, respectively, and executed by the processors 220, 206a and 250, respectively, to perform the functions described herein. The working memory may be a volatile memory, e.g., RAM. The processors 206a, 220, and 250 described may include a microprocessor or other implementation of a processing unit.

The memories and working memories may comprises computer-readable non-transitory media. Such media can include all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Various computing devices may utilize all of the components shown, or only a subset of the components, and levels of integration may vary from device to device. Furthermore, a device may contain multiple instances of a component, such as multiple processing units, processors, memories, transmitters, receivers, etc. The data source may comprise a hardware storage device which stores samples of data which are to be processed. The processors may be any type of electronic data processor such as a CPU. The input/output devices may include network interfaces, storage interfaces, monitors, keyboards, pointing devices and the like. A working memory may store code, e.g., instructions which are executed by a processor to carry out the functions described herein. The code may be stored in a non-volatile memory and loaded into the working memory.

The memory/storage devices may comprise any type of system memory such as static random access memory (SRAM), dynamic random access memory (DRAM), synchronous DRAM (SDRAM), read-only memory (ROM), a solid state drive, hard disk drive, a magnetic disk drive, or an optical disk drive. The memory devices may include ROM for use at boot-up, and DRAM for program and data storage for use while executing programs. The memory devices may include non-transitory, hardware memory devices.

The loaders 210a and 210b can be configured similarly to the other devices shown, having a processor, a memory, a working memory and a network interface. As mentioned, the loader 210a can be used for directly loading initial data into the storage device 209, such as described further in connection with FIG. 3A, or the loader 210b can be used for indirectly loading initial data into the storage device 209, such as described further in connection with FIG. 3B.

Figure 2C:
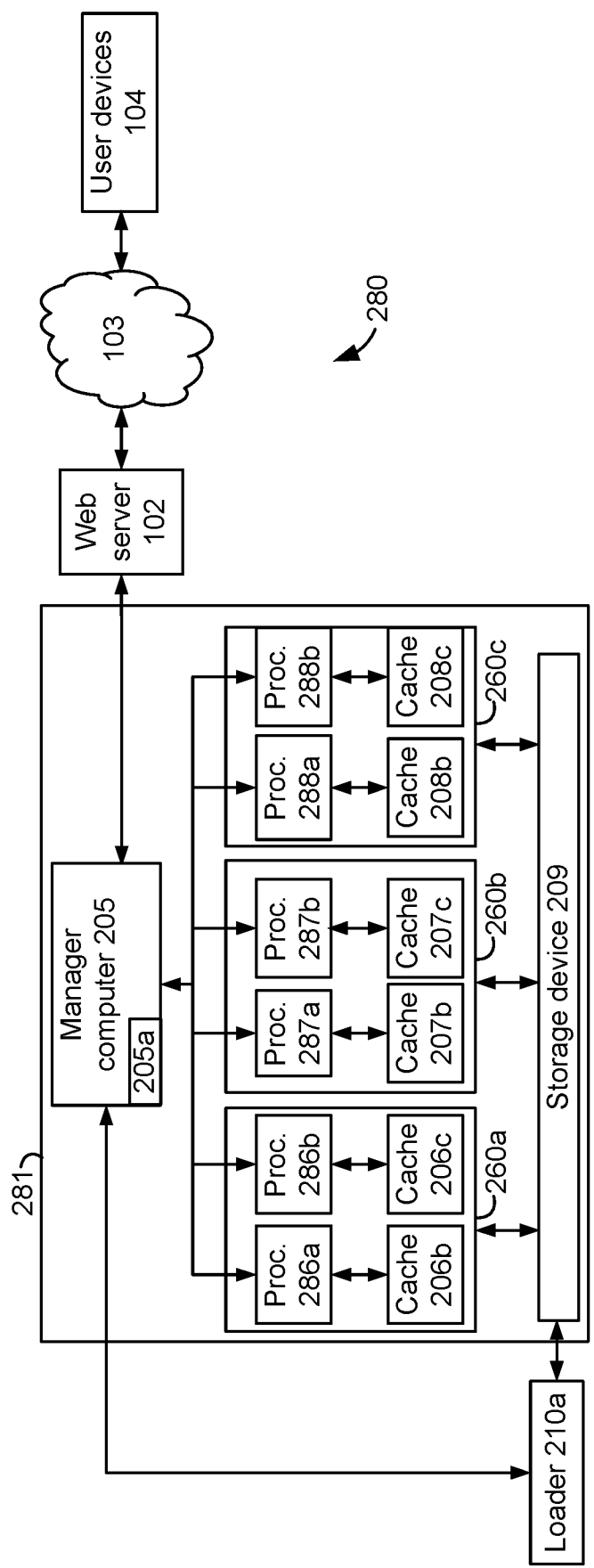
FIG. 2C is yet another example of the network of FIG. 2A according to an embodiment.

FIG. 2C is yet another network 280 for accessing data according to an embodiment. The network 280 is an alternative to the example network 200 of FIG. 2A. In this alternative, a computing node has multiple processors and caches. The loader 210a, used for direct loading of the storage device, as discussed previously, is repeated. Alternatively, the loader 210b, used for indirect loading of the storage device, as discussed previously, may be used. Both direct and indirect loading could be used as well. In this network 280, a data storage system 281 includes computing nodes 260a-260c. The computing node 260a has processors 286a and 286b which access caches 206b and 206c, respectively. Computing node 260b has processors 287a and 287b which access caches 207b and 207c, respectively. Computing node 260c has processors 288a and 288b which access caches 208b and 208c, respectively. This approach can improve response times because the computing node can perform multiple tasks concurrently. For example, in the computing node 260a, one processor 286a can communicate with the manager computer, for example, while the other processor 286b accesses a cache 206c.

Figures 3A, 3B:
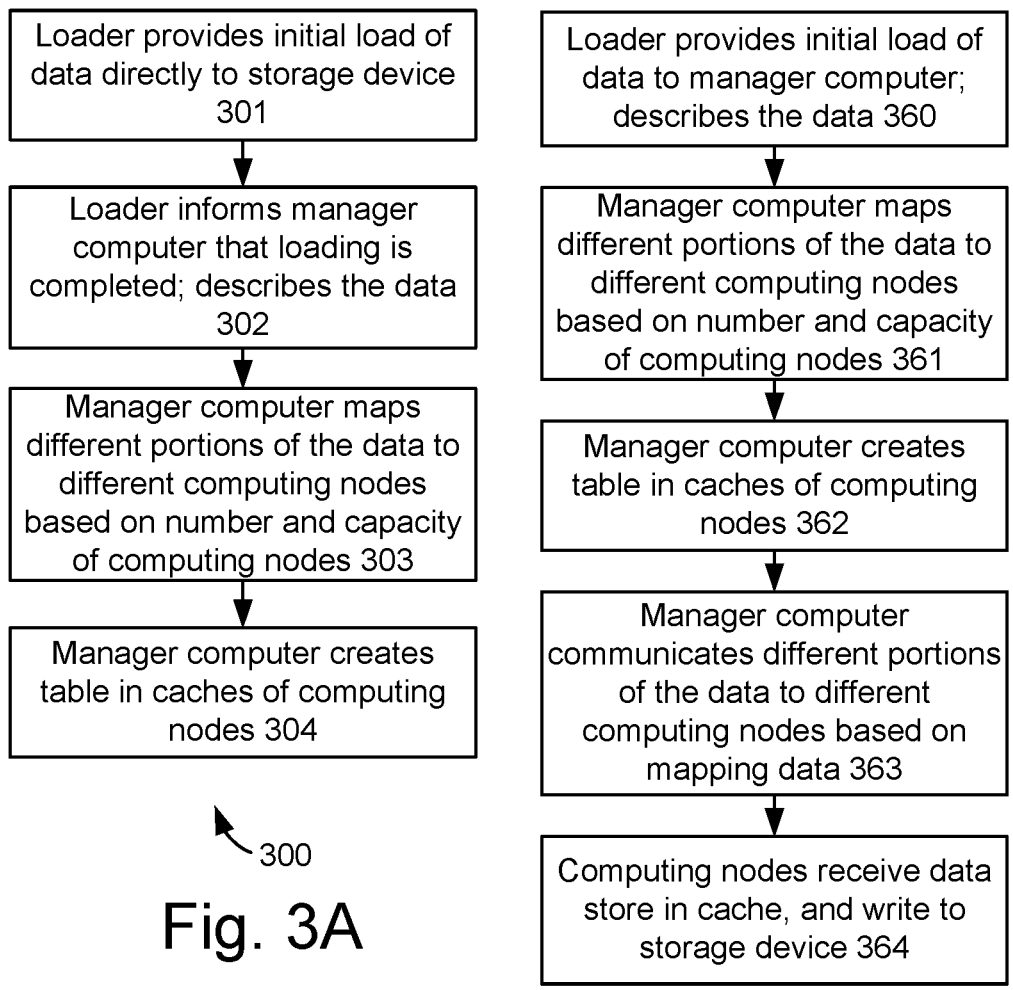
FIG. 3A is a flowchart of a method for loading data into a storage device in the network according to an embodiment.
FIG. 3B is a flowchart of another method for loading data into the storage device according to an embodiment.

FIG. 3A is a flowchart 300 of a method for loading data into a storage device in the network according to an embodiment. The method can directly load data according to FIG. 2A or 2B using the loader 210a. Direct loading is the fastest way to transfer a large amount of data, e.g., a terabyte or more, to the storage device.

At step 301, the loader provides an initial load of data directly to a storage device. The storage device stores the data in a storage medium. In one approach, the data comprises compression units (CUs) in which rows and/or columns of data of a table are compressed. In an example implementation, data is fed into the storage device using RESTful API commands. In one possible implementation, the file comprises an SQL table of data. See also FIGS. 6, 7A and 7B. For example, in a banking application, the file may comprise a table in which rows correspond to different customers of a bank and columns correspond to balances in different types of accounts. The data can be provided by the bank via a network or a physical storage medium. In another approach, a table may list different products in rows and provide different characteristics of the products in columns. Or, different tables can be provided for products of different manufacturers.

At step 302, the loader informs the manager computer that the loading is completed and describes the data. Alternatively, the storage device informs the manager computer that the loading is completed. The storage device may communicate with the manager computer via one of the computing nodes, for instance.

The description of the data may indicate that the data comprises table data with a certain table size, with certain row names and data types and column names and data types. Example data types include Boolean, integer, float, currency, fixed string, variable string and binary object. Moreover, the type of database can be described. Examples include Microsoft Access, Microsoft SQL Server, Oracle SQL, MySQL and PostgreSQL. At step 303, the manager computer maps different portions of the data to different computing nodes based on the number and capacity of the computing nodes. Assuming there are N computing nodes having an equal storage capacity, approximately 1/Nth of data is mapped to each computing node in some examples. The mapping is stored as mapping data. See also FIG. 7A to 9C. If the cache of one computing node has a relatively larger storage capacity, a relatively larger amount of data of the storage device may be mapped to it.

At step 304, the manager computer creates a table in the caches of the computing nodes. For example, the manager computer may use the description of the data to create a table with the specified number of columns with column names and data types. The table may include one or more rows of null data. That is, the table may be initially unpopulated. Subsequently, when the table is populated, rows of data from the storage device can be inserted into the table.

FIG. 3B is a flowchart 350 of another method for loading data into the storage device according to an embodiment. The method loads data via a managing computer and computing nodes in the network of FIG. 2B using the loader 210b, in an indirect loading process. In this process, the data reaches the storage device of the data storage system after passing through other components. At step 360, the loader provides an initial load of data to the manager computer and describes the data. At step 361, the manager computer maps different portions of the data to different computing nodes based on the number and capacity of the computing nodes. At step 362, the manager computer creates a table in the caches of the computing nodes. At step 363, the manager computer communicates different portions of the data to the different computing nodes based on the mapping data. Each computing node receives the data which is mapped to it. At step 364, the computing nodes receive the data, store it in the respective caches, and write the data to the storage device of the data storage system. As mentioned, this approach is more time consuming but ensures that the caches are loaded when the data storage system is first used.

Figure 4:
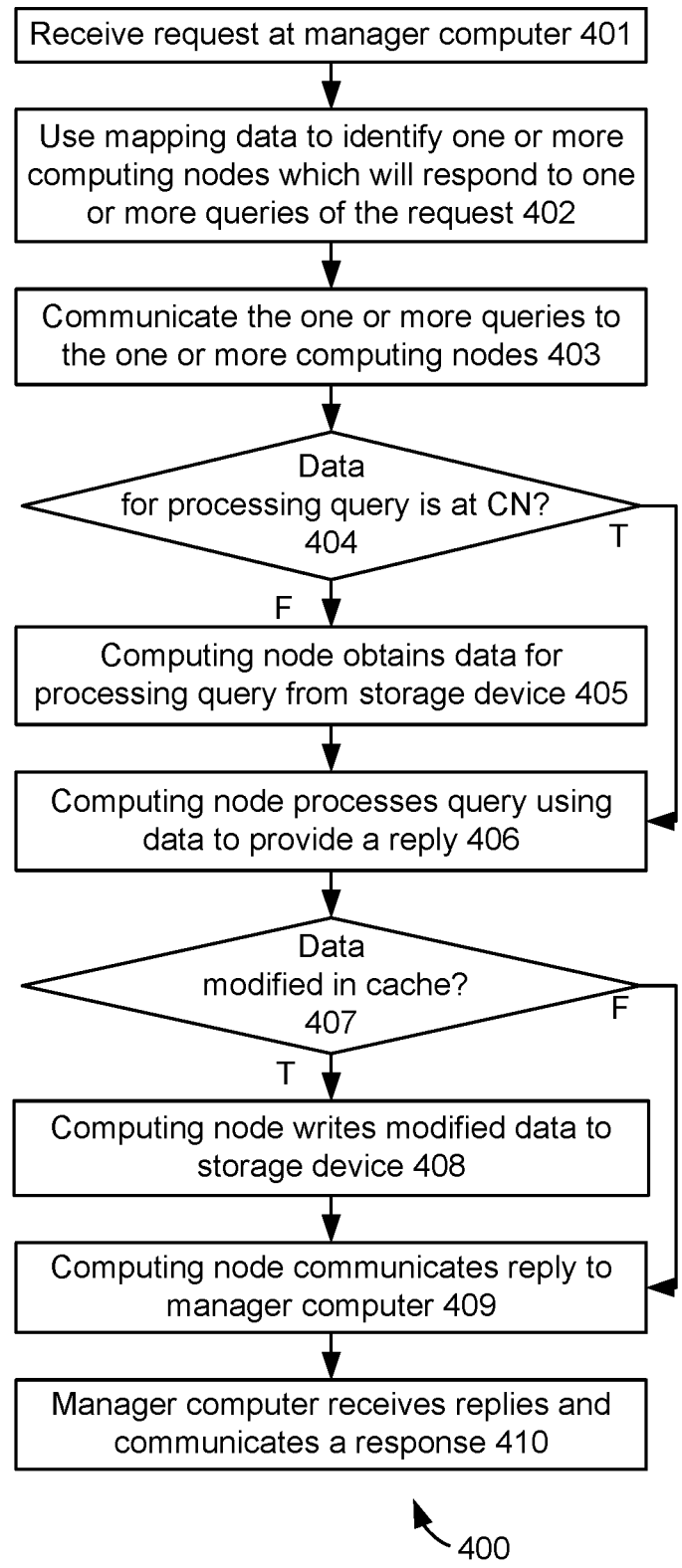
FIG. 4 is a flowchart of a method for processing a request in the network according to an embodiment.

FIG. 4 is a flowchart 400 of a method for processing a request in the network according to an embodiment. The method can process a request using the data storage systems as shown in FIG. 2A or 2B. Step 401 includes receiving a request at the manager computer. For example, the request may be received from a web server which in turn is responsive to a request from a user computing device. Step 402 includes using the mapping data to identify one or more computing nodes which will respond to one or more queries of the request (see also FIGS. 7A and 7B). Generally, a request may involve one or more queries. For instance, a request may be to obtain the total monetary balance of a user at a bank, while the queries may involve obtaining balances from individual accounts at the bank. Step 403 includes communicating the one or more queries to the one or more computing nodes. For each of the one or more computing nodes, a decision step 404 determines if the data for processing a query is already at the computing node. If this decision step is true, the computing node processes the query using the data to provide a corresponding reply at step 406. For example, this processing can include reading a data field from a table. If the data is in compression units or other compressed form, it may be uncompressed before it is used. Calculations may also be performed using one or more data fields.

If decision step 404 is false, the computing node obtains data for processing the query from the storage device at step 405. For example, this can include loading one or more rows of data from the storage device and storing it in the cache. Step 406 is then performed.

At step 407, it is determined if the data has been modified in the cache in connection with step 406. If true, the data has been modified, the method branches to step 408. Otherwise, the method proceeds to step 409. The processing of the query at step 406 by the computing node could result in modifying the data in the cache to provide modified data. The computing node writes the modified data to the storage device in step 408. For example, in a banking application, a user may transfer money between accounts, thereby changing the balances of the accounts. By writing the modified data to the storage device, the data in the storage device remains consistent with the data in the computing nodes.

At step 409, the computing node communicates its reply to the manager. At step 410, the manager computer receives the replies and communicates a corresponding response. In some cases, multiple replies are assembled to provide one response. A response could also be based on a single reply. The response may be provided to the web server which in turn provides a response to the user, for instance. Although step 409 is after step 408 in the flowchart, the computing node could alternatively communicate its reply before or during the writing of the modified data to the storage device.

Figure 5:
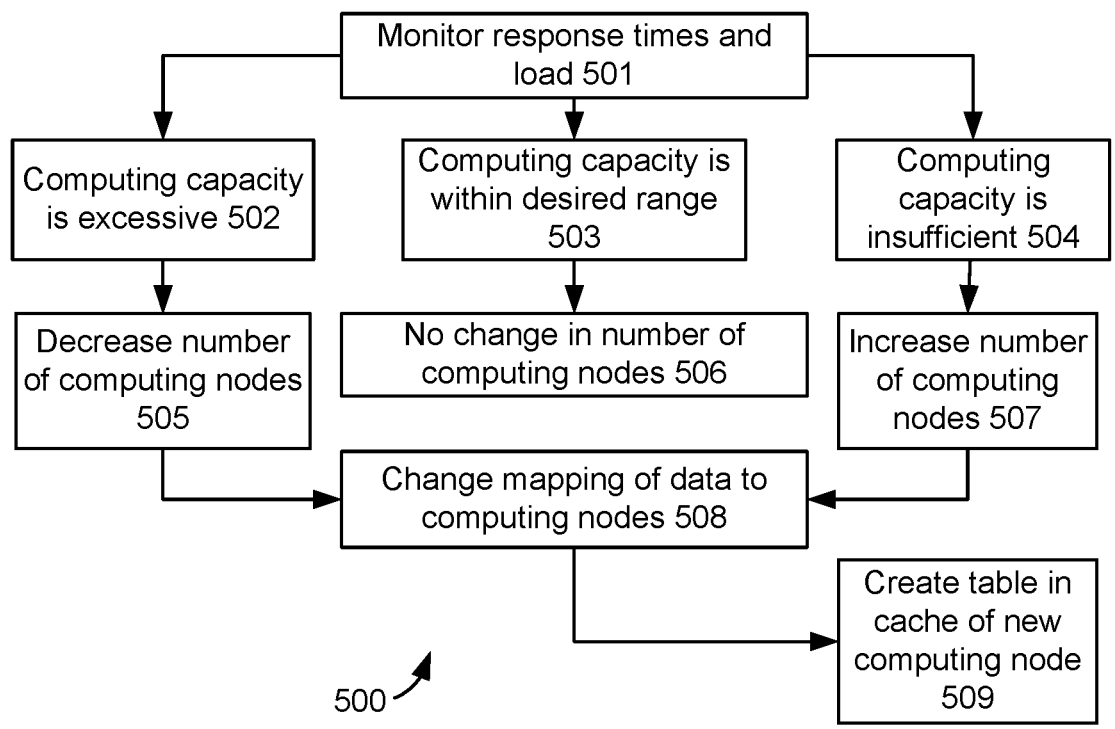
FIG. 5 is a flowchart of a method for changing a number of computing nodes and remapping data of a storage device to computing nodes in an embodiment.

FIG. 5 is a flowchart 500 of a method for changing a number of computing nodes and remapping data of a storage device to computing nodes in an embodiment. The manager computer in some examples is configured to modify the mapping based on response times for replies to the queries provided by the computing nodes. It may be desirable to change the number of nodes at the data storage system for various reasons. For example, additional nodes can be used when the load and the response times become high, or nodes can be removed when the load is reduced.

At step 501, response time and/or the load on the data storage system is monitored. The response time can be defined, e.g., as the time between the receipt of a request at the manager computer and the transmission of a corresponding response. The response time can be tracked by the manager computer. Other devices can track response time as well such as the web server and the user computing device. The load may be represented by the rate at which requests are received at the manager computer, for instance. Other factors may be used to adjust the number of computing nodes, such as time of day, and day of week and estimated usage of the data storage system based on other factors.

In a first path, at step 502, the computing capacity is considered to be excessive, e.g., above a threshold level. At step 505, the number of computing nodes is accordingly decreased. The decrease can be in proportion to the degree of over-capacity. The method then proceeds to step 508.

In a second path, at step 503, the computing capacity is considered to be within a desired range. At step 506, no changes are made in the number of computing nodes.

In a third path, at step 504, the computing capacity is considered to be insufficient, e.g., below a threshold. At step 507, the number of computing nodes is increased. The increase can be in proportion to the degree of the insufficiency. The capacity may be insufficient when the load become too high. The method then proceeds to step 508.

At step 508, where the number of computing nodes is increased or decreased, the mapping data is changed. For a newly added node, the mapping maps data to it while reducing the amount of data mapped to the previously existing nodes. For a removed node, the mapping maps the data of the removed node to the remaining nodes.

In one implementation, the storage device comprises a hard disk drive. The manager computer, to modify the mapping, is configured to change a mounting of partitions of the hard disk drive to the caches. A partition is a region on a hard disk which is managed separately by an operating system.

For the case of a decrease in the number of computing nodes, a removed computing node can be powered off or allocated for some other use.

For the case of an increase in the number of computing nodes, step 509 includes creating a table in the cache of the new computing node. As mentioned, the data portion which is no longer mapped to a computing node may be deleted eventually, using an LRU algorithm, for example. In one approach, the LRU algorithm involves deleting least recently used data first in the cache. This is data which has not been accessed by the processor of the computing node for some time.

Figures 6, 7A:
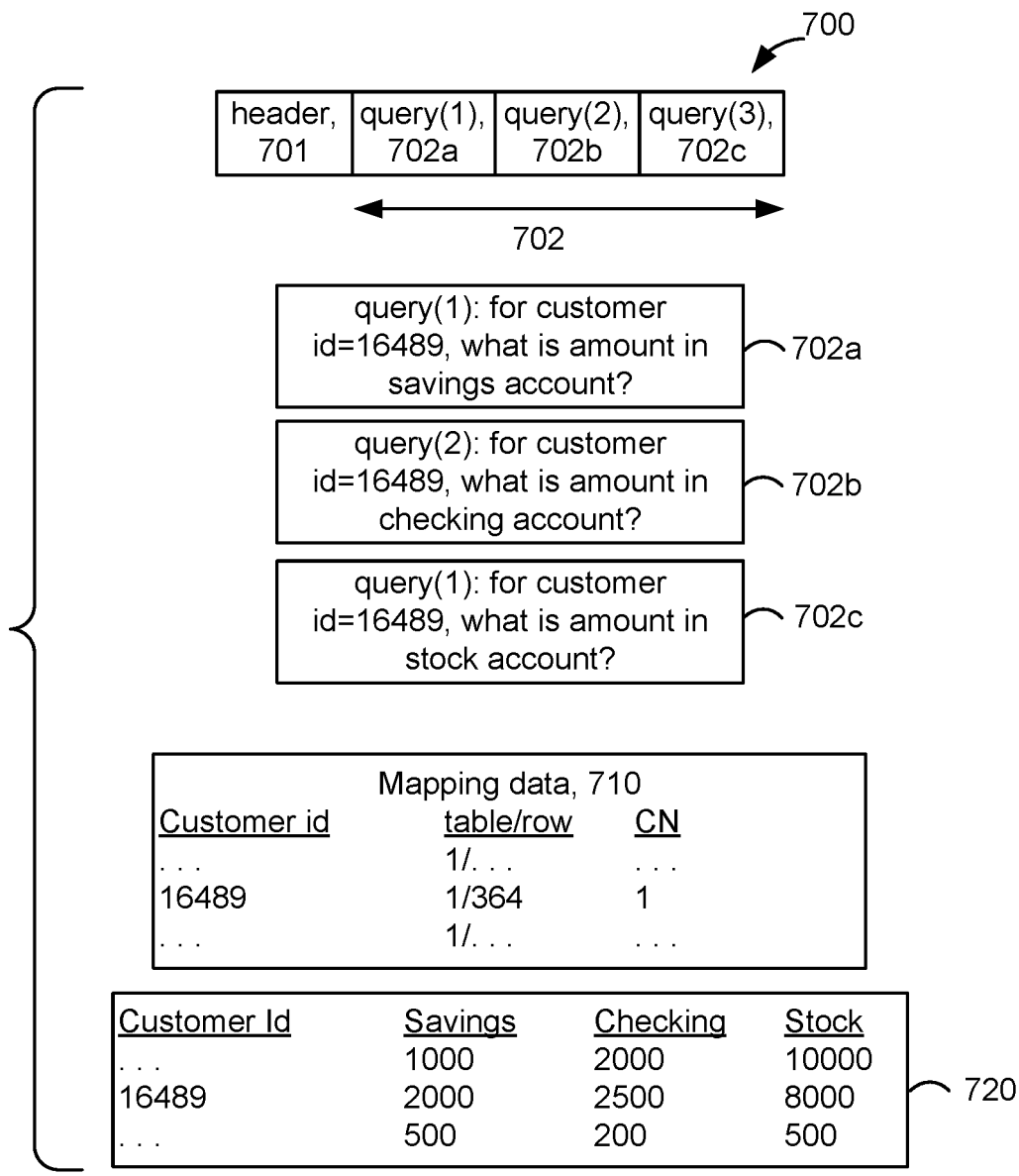
FIG. 6 depicts an example of table data in a storage device.
FIG. 7A depicts an example implementation of the table data of FIG. 6.

FIG. 6 depicts an example of table data in a storage device. A table can include rows and columns. A data field is provided at the intersection of a row and column. Here, there are y rows and x columns. Example rows have names of Name_row(1), Name_row(2), . . . , Name_row(y). Example columns have names of Name_col(1), Name_col(2), Name_col(3), . . . , Name_row(x). The data fields in row(1) are field(1,1), field (1,2), field(1,3), . . . , field(1,x). The data fields in row(2) are field(2,1), field (2,2), field (2,3), . . . , field(2,x), and the data fields in row(y) are field(y,1), field (y,2), field(y,3), . . . , field(y,x). As mentioned, the table may have the columns and their names and data types defined, but may be initially empty. One or more rows can be added over time to respond to queries. For example, the table in the storage device may have rows for thousands or even millions of customers of a bank. The data of one subset of the customers can be mapped to a computing node. When a query arrives regarding a particular customer, such as a query regarding account balances, a corresponding row of data can be added to the table to respond to the query. This row of data may remain in the table in the cache for some time so that a further query regarding the same customer can be quickly answered. If there is no further query for some time, the row of data for that customer can be deleted from the cache based on the LRU algorithm.

One approach for inserting a row of data into a table uses the SQL INSERT INTO SELECT statement. This copies a row of data (which is mapped to a computing node) from the storage device into the table in the cache of the computing node. The statement copies data from one table and inserts it into another, target table, thereby populating the target table. Any existing rows in the target table are unaffected.

FIG. 7A depicts an example implementation of the table data of FIG. 6. A packet of data 700 represents a request which may be received by the manager computer. The packet includes a header 701 and a payload 702. The header may contain information such as an error correction code (ECC) data, which is used by the manager computer to determine if a packet is successfully received. A packet identifier (id) may also be used to identify a sequential position of the packet in a group of packets. The payload may include data regarding a request which was broken up into multiple queries, for instance, such as query(1) 702a, query(2) 702b and query(3) 702c. As an example, query(1) may state: for a certain customer with an id=16489, what is the amount in the savings account? Query(2) may state: for the customer id=16489, what is the amount in the checking account? Query(3) may state: for the customer id=16489, what is the amount in the stock account?

Mapping data 710 at the manager computer may be used to identify CN1, e.g., computing node 204a, as the computing node which should respond to these queries. The mapping data cross-references a customer id to a table/row and to a computing node (CN). For example, customer id=16489 is cross-referenced to table=1 and row=364. In some cases, the caches can have data in more than one table so that the table identifier distinguishes between tables. The manager computer can therefore communicate the queries to CN1. A table 720 is present in the cache of CN1. The row corresponding to customer id=16489 is cross referenced to account balances of 2000, 2500 and 8000 in the savings, checking and stock accounts, respectively. The computing node can therefore return the values of 2000, 2500 and 8000 as replies to the queries to the manager computer. The manager computer can similarly provide a response to the web server with these replies, and the web server can provide a response to the user computing device.

Figure 7B:
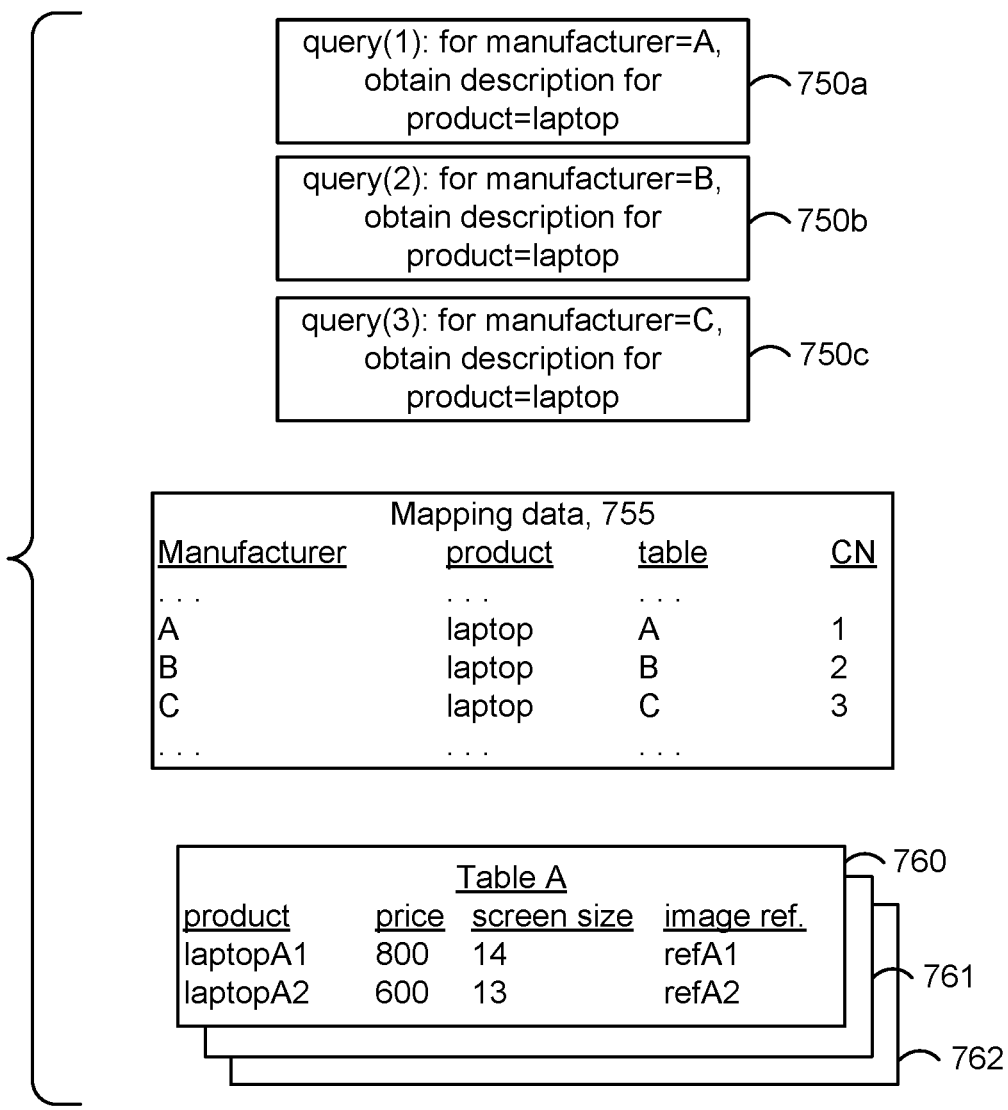
FIG. 7B depicts another example implementation of the table data of FIG. 6.

FIG. 7B depicts another example implementation of the table data of FIG. 6. In this example, data of different tables is stored in different computing nodes. For example, the products of different manufacturers may be stored in different tables, one table per manufacturer. Further, a single table can be stored in one or more computing nodes. In this example, query(1) 750a may state: for manufacturer=A, obtain description for product=laptop, query(2) 750b may state: for manufacturer=B, obtain description for product=laptop, and query(3) 750c may state: for manufacturer=C, obtain description for product=laptop. The mapping data 755 cross references manufacturers to products, tables and computing nodes. For example, manufacturer=A is cross referenced to product=laptop, table=A and CN=1, manufacturer=B is cross referenced to product=laptop, table=B and CN=2, and manufacturer=C is cross referenced to product=laptop, table=C and CN=3. The manufacturers can be cross referenced to other products as well which are not shown.

Table A 760, Table B 761 and Table C 762 are depicted. Table A cross references a laptop product to a price, a screen size and an image reference. For example, product=laptopA1 is cross referenced to price=$800, screen size=14 inches and image ref.=refA1, and product=laptopA2 is cross referenced to price=$600, screen size=13 inches and image ref.=refA2. In response to query (1), query(2) and query(3), CN1, CN2 and CN3, respectively, can provide a reply which includes the data relating to laptops in Table A, B and C, respectively. These replies can be assembled into a response for the web server and user device. A corresponding web page display may be provided on the user device.

FIG. 8A depicts an example of mapping data of a storage device to N computing nodes (CNs), consistent with step 303 of FIG. 3A and step 361 of FIG. 3B. N is an integer number>=1. The computing nodes are denoted by CN(1), CN(2), CN(N) and the data portions in the storage device 209 which are mapped to the computing nodes are data portion 1 (801), data portion 2 (802), . . . , data portion N (804), respectively. Each data portion comprises approximately 1/Nth of the data in the storage device.

FIG. 8B depicts an example of mapping data of a storage device to N+2 computing nodes, consistent with step 507 of FIG. 5. Thus, two new computing nodes are added compared to FIG. 8A. The computing nodes are denoted by CN(1), CN(2), CN(N), CN(N+1), CN(N+2) and the data portions in the storage device 209 which are mapped to the computing nodes are data portion 1 (801a), data portion 2 (802a), . . . , data portion N (804a), data portion N+1 (805), and data portion N+2 (806), respectively. Each data portion comprises approximately 1/(N+2)th of the data in the storage device.

An example method for accessing data comprises, with one or more processors: mapping a portion of table data to each computing node of a number N computing nodes; creating a table in each of the N computing nodes; at each of the N computing nodes, populating the table in response to a query by copying data which is mapped to the computing node from a storage device; in response to an increasing load, using an additional M (e.g., M=2 in FIG. 8B) computing nodes to access the data of the storage device; mapping a portion of the table data to each computing node of the N+M computing nodes; creating a table in each of the M computing nodes; and at each of the M computing nodes, populating the table in response to a query by copying data which is mapped to the computing node from the storage device.

In another example implementation, a non-transitory computer-readable medium is provided storing computer instructions for accessing data, that when executed by one or more processors, cause the one or more processors to perform the steps of: identifying a computing node which is configured to respond to a query, based on a mapping of data of a storage device to the computing nodes, wherein the mapping is time-varying based on a time-varying number of computer nodes; communicating the query to the computing node; and receiving a reply to the query from the computing node. The computing node provides the reply using the data mapped to the computing node, and the data mapped to the computing node is copied to the computing node from the storage device. A response is provided to the request based on the reply.

Further, the data of the storage device may comprise a table. The identifying the computing node which is configured to respond to the query comprises identifying a row in the table. Different rows of the table are mapped to different computing nodes.

Moreover, a number of rows mapped to each computing node is time-varying based on the time-varying number of computer nodes.

In an example implementation, the data in the storage device is in rows of a table. Different rows of data are mapped to different caches. The modified mapping changes a number of the rows which is mapped to each of the caches.

FIG. 8C depicts an example of mapping data of a storage device to N−1 computing nodes, consistent with step 507 of FIG. 5. The computing nodes are denoted by CN(1), CN(2), CN(N−1). The data portions in the storage device 209 which are mapped to the computing nodes are data portion 1

(801*b*), data portion 2 (802*b*), . . . , and data portion N−1 (803), respectively. Each data portion comprises approximately 1/(N−1)th of the data in the storage device. Thus, one node is removed compared to FIG. 8A.

Figures 9A, 9B, 9C:
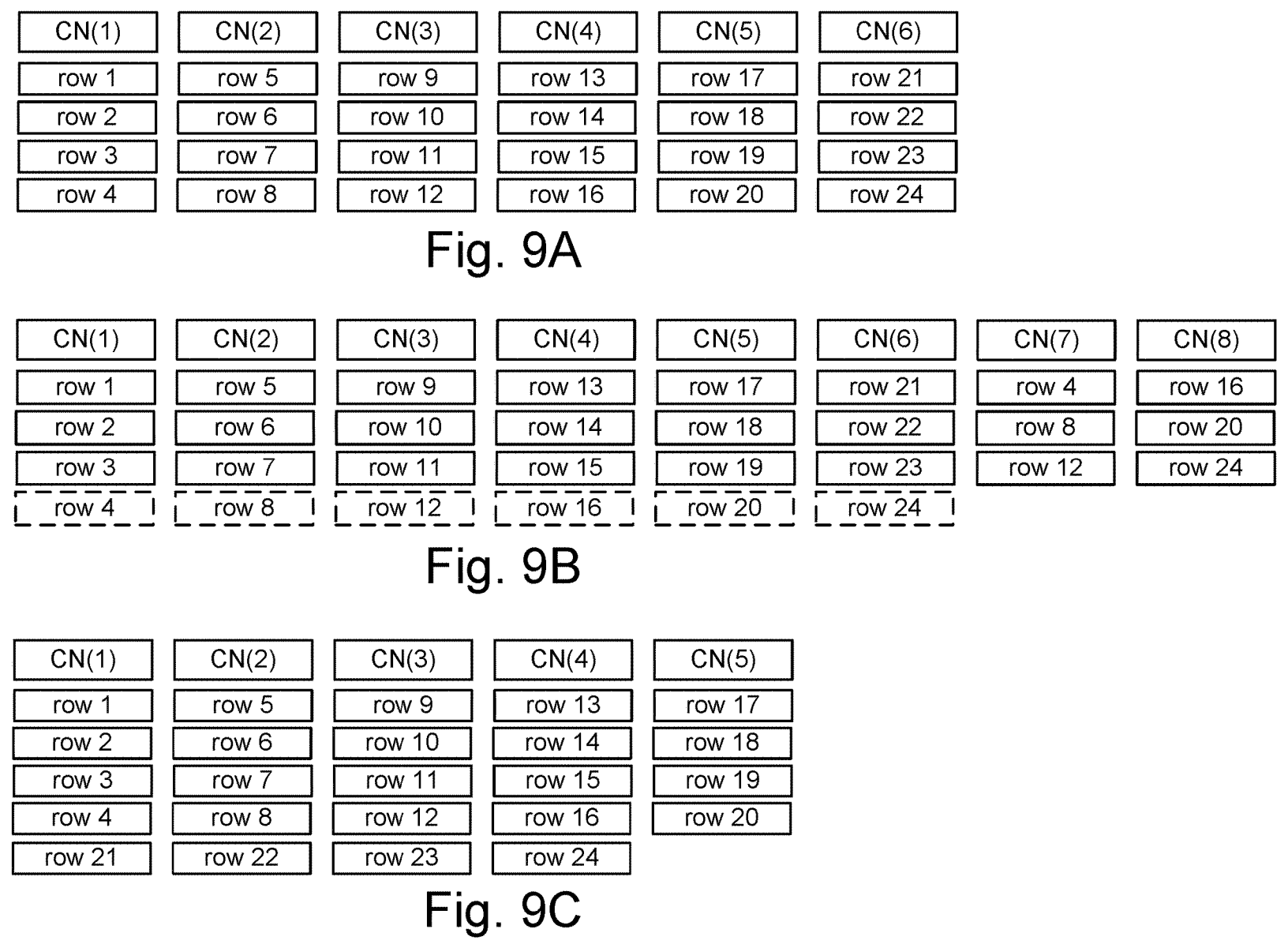

FIG. 9A depicts an example implementation of the mapping of FIG. 8A. The examples of FIG. 9A to 9C correspond to 8A to 8C, respectively, with N=6. Further, assume the data in the storage device comprises a table with 24 rows of data. The computing nodes are CN(1) to CN(6). In this example, 24/6=4 rows are mapped to each CN. Rows 1 to 4 are mapped to CN(1), rows 5 to 8 are mapped to CN(2), rows 9 to 12 are mapped to CN(3), rows 13 to 16 are mapped to CN(4), rows 17 to 20 are mapped to CN(5), and rows 21 to 24 are mapped to CN(6).

FIG. 9B depicts an example implementation of the mapping of FIG. 8B. Here, 24/8=3 rows are mapped to each CN. Rows 1 to 3 are mapped to CN(1), rows 5 to 7 are mapped to CN(2), rows 9 to 11 are mapped to CN(3), rows 13 to 15 are mapped to CN(4), rows 17 to 19 are mapped to CN(5), rows 21 to 23 are mapped to CN(6), rows 4, 8 and 12 are mapped to CN(7), and rows 16, 20 and 24 are mapped to CN(8). Rows 4, 8, 12, 16, 20 and 24 are no longer mapped to CN(1), CN(2), CN(3), CN(4), CN(5) and CN(6), respectively, as shown by the dashed line boxes. These rows of data can be deleted using an LRU algorithm, in one approach, similar to the way data would be deleted at the computing nodes in the absence of a change in the number of computing nodes. The preexisting computing nodes CN(1) to CN(6) continue with their normal operations and are not interrupted by the change in the number of computing nodes. The rows which were unmapped from CN(1) to CN(6) are mapped to the new computing nodes CN(7) and CN(8).

FIG. 9C depicts an example implementation of the mapping of FIG. 8C. Here, 24/5=approximately 5 rows are mapped to each CN. Rows 1 to 4 and 21 are mapped to CN(1), rows 5 to 8 and 22 are mapped to CN(2), rows 9 to 12 and 23 are mapped to CN(3), rows 13 to 16 and 24 are mapped to CN(4), and rows 17 to 20 are mapped to CN(5). Rows 21, 22, 23 and 24 which are unmapped from CN(6) are now mapped to CN(1), CN(2), CN(3) and CN(4), respectively. The preexisting computing nodes CN(1) to CN(5) continue with their normal operations and are not interrupted by the change in the number of computing nodes.

FIG. 9A to 9C provide an example of using consistent hashing to modify the mapping of data of the storage device to the computing nodes. As mentioned, consistent hashing maps data to the same cache, as far as possible. When a cache is added, it takes its share of data from all the other caches. When a cache is removed, its data is shared among the remaining caches.

Figure 10:
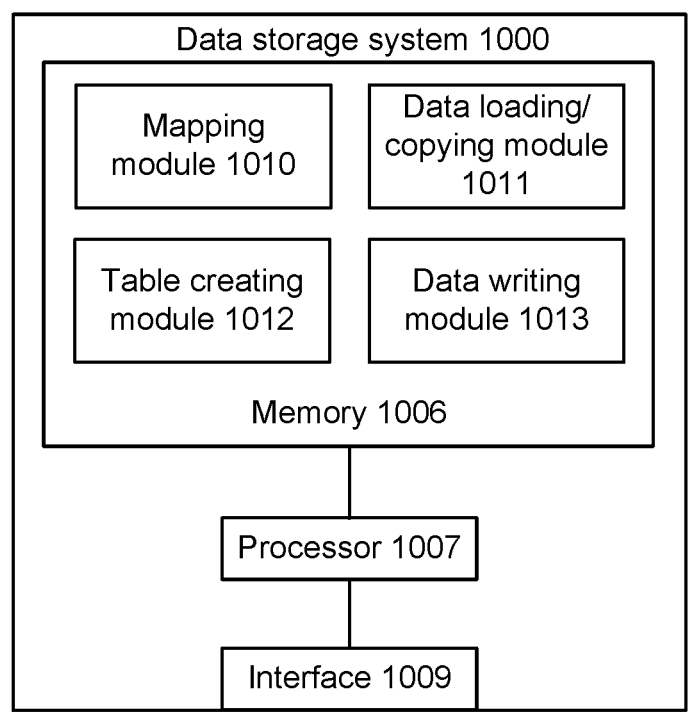
FIG. 10 is a block diagram including modules to implement the disclosed technology.

FIG. 10 is a block diagram of a data storage system 1000 according to an embodiment. The data storage system 1000 can implement the data storage system 201, 260 or 281 of FIG. 2A, 2B or 2C, respectively. The data storage system 1000 can alternatively implement a manager computer 205 of FIGS. 2A-2C. The data storage system 1000 can implement any of the methods illustrated in FIG. 3A, 3B, 4, or 5.

In some embodiments, the data storage system 1000 includes modules to implement the disclosed technology. The modules included in the block diagram may be logic and/or software that are designed to implement the disclosed functions. The data storage system 1000 in the example shown includes an interface 1009, a processor 1007, and a memory 1006. The interface 1009 comprises an interface that exchanges communications between the data storage system 1000 and external components, devices, networks, or systems. The processor 1007 comprises a suitable processing device capable of executing software stored in the memory 1006. The memory 1006 comprises a suitable storage device. The memory 1006 can comprise one or more storage elements or components. The memory 1006 stores software to be executed by the processor 1007, for example. The memory 1006 includes, for example, a mapping module 1010, a data loading/copying module 1011, a table creating module 1012 and a data writing module 1013. The mapping module 1010 may provide mapping data which maps a different portion of the data in the storage device to each of the caches. The manager computer may be configured to change a number of the computing nodes and to modify the mapping in response to the change, to provide a modified mapping, and to pass queries to the computing nodes. The data loading/copying module 1011 may be used to load, into the table in the cache, from the storage device, one or more rows of data which are mapped to the cache and which are needed to respond to a query. Further, for each computing node, the processor may be used to copy data from the storage device which has been mapped to the cache, into the cache, if the data is not already in the cache and is needed to respond to a query.

The table creating module 1012 may be used for each computing node to create a table in the cache, where the table comprises column names and is initially empty. The data writing module 1013 may be used for each computing node to write modified data in the cache to the storage device. The data writing module 1013 may also be used to write data from an initial data load to the storage device.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, numerous specific details are set forth in order to provide a thorough understanding. However, it will be clear to those of ordinary skill in the art that the embodiments may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
a non-transitory memory storage comprising instructions; and
one or more processors in communication with the non-transitory memory storage, wherein the one or more processors execute the instructions to:
provide an initial mapping which maps data in a storage device to a first plurality of caches, wherein each first cache among the first plurality of caches is mounted to a respective first processor in a first plurality of cache-processor pairs to allow the respective first processor to access the first cache without making a network call, the first plurality of cache-processor pairs are arranged in a plurality of computing nodes with at least one cache-processor pair per computing node, and each first cache among the first plurality of caches copies a data portion of the data from the storage device based on the initial mapping and using a network call;
change a number of the computing nodes, the changed number of computing nodes comprise a second plurality of caches, each second cache among the second plurality of caches is mounted to a respective second processor in a second plurality of cache-processor pairs to allow the respective second processor to access the second cache without making a network call, the second plurality of cache-processor pairs are arranged in the changed number of computing nodes with at least one cache-processor pair per computing node;
provide a modified mapping in response to the change, the modified mapping maps data in the storage device to the second plurality of caches;
for at least one second cache, take a data share of the data which is mapped to a first cache in the initial mapping, the taking of the data share comprises copying the data share from the storage device based on the modified mapping and using a network call without transferring the data share from the first cache to the at least one second cache; and
pass queries to the computing nodes, the computing nodes respond to the queries using data stored in the caches.

2. The device of claim 1, wherein:
the storage device comprises a hard disk drive; and
the one or more processors execute the instructions to change a mounting of partitions of the hard disk drive to the caches to modify the mapping.

3. The device of claim 1, wherein:
the one or more processors execute the instructions to use consistent hashing to modify the mapping.

4. The device of claim 1, wherein:
the data in the storage device is in rows of a table;
the change in the number of the computing nodes comprises an addition of one or more computing nodes comprising the at least one cache;
the share of the data which is taken from the first cache by the at least one second cache comprises a row share of the rows of the table which are mapped to the first cache in the initial mapping; and
the row share of the rows of the table are deleted in the first cache due to the modified mapping.

5. The device of claim 4, wherein:
the row share of the rows of the table which are deleted in the first cache due to the modified mapping remain in the first cache until deleted by a least recently used algorithm.

6. The device of claim 1, wherein:
the one or more processors execute the instructions to, for each computing node, create a table in a particular cache of the computing node, the table comprises column names and is initially empty, and in response to a query to the computing node, load into the table in the particular cache, from the storage device, one or more rows of data which are mapped to the particular cache and which are needed to respond to the query.

7. The device of claim 1, wherein the one or more processors further execute the instructions for each computing node to:
create a table in a corresponding cache of the each computing node; and
in response to a query, load data mapped to the corresponding cache of the each computing node into the table in the corresponding cache from the storage device, the data being needed to respond to the query, the load being performed without loading data into the table that is mapped to the corresponding cache but is not needed to respond to the query.

8. The device of claim 1, wherein:
for each computing node, the one or more processors execute the instructions to copy data from the storage device mapped to a corresponding cache of the each computing node, the data being copied into the corresponding cache if the data is not already in the corresponding cache and is needed to respond to a query.

9. The device of claim 1, wherein:
common portions of the data are not mapped to different caches.

10. The device of claim 1, wherein:
the one or more processors execute the instructions to determine a portion of the data which is in relatively high demand and map the portion of the data which is in relatively high demand to multiple caches.

11. The device of claim 1, wherein:
for each computing node, the one or more processors execute the instructions to modify data in a corresponding cache of the each computing node to provide modified data, and to write the modified data to the storage device.

12. The device of claim 1, wherein:
the one or more processors execute the instructions to modify the mapping based on response times for replies to the queries provided by the computing nodes.

13. The device of claim 1, wherein:
the one or more processors execute the instructions to provide an initial data load into the storage device via the computing nodes, and the computing nodes are configured to write data from the initial data load to the storage device.

14. The device of claim 1, wherein:
the one or more processors execute the instructions to provide an initial data load into the storage device which bypasses the computing nodes.

15. The device of claim 1, wherein:
the changed number of computing nodes comprise a new computing node and pre-existing computing nodes;
the second plurality of caches comprise a new cache in the new computing node;
the new cache copies a share of the data from the storage device based on the modified mapping, without transferring the share of the data from the pre-existing computing nodes to the new computing node; and
the share of the data is mapped to the first plurality of caches in the pre-existing computing nodes in the initial mapping.

16. The device of claim 1, wherein:
the change in the number of the computing nodes removes a computing node from the plurality of computing nodes, resulting in remaining computing nodes;
the second plurality of caches comprise remaining caches in the remaining computing nodes;
the remaining caches copy a share of the data from the storage device based on the modified mapping by transferring the share of the data from the removed computing node to the remaining computing nodes; and
the share of the data is mapped to the removed computing node in the initial mapping.

17. The device of claim 1, wherein:
the storage device comprises a hard disk drive;
the caches of the first plurality of caches and the second plurality of caches comprise a solid state memory; and
the storage device has a lower access speed than the caches of the first plurality of caches and the second plurality of caches.

18. A computer-implemented method for accessing data, comprising:
one or more processors providing an initial mapping which maps data in a storage device to a first plurality of caches, wherein each first cache among the first plurality of caches is mounted to a respective first processor in a first plurality of cache-processor pairs to allow the respective first processor to access the first cache without making a network call, the first plurality of cache-processor pairs are arranged in a plurality of computing nodes with at least one cache-processor pair per computing node, and each first cache among the first plurality of caches copies a data portion of the data from the storage device based on the initial mapping and using a network call;
one or more processors changing a number of the computing nodes, the changed number of computing nodes comprise a second plurality of caches, each second cache among the second plurality of caches is mounted to a respective second processor in a second plurality of cache-processor pairs to allow the respective second processor to access the second cache without making a network call, the second plurality of cache-processor pairs are arranged in the changed number of computing nodes with at least one cache-processor pair per computing node;
one or more processors providing a modified mapping in response to the change, the modified mapping maps data in the storage device to the second plurality of caches;
for at least one second cache, one or more processors taking a data share of the data which is mapped to a first cache in the initial mapping, the taking of the data share comprises copying the data share from the storage device based on the modified mapping and using a network call without transferring the data share from the first cache to the at least one second cache; and
one or more processors passing queries to the computing nodes, the computing nodes respond to the queries using data stored in the caches.

19. The computer-implemented method of claim 18, wherein:
the providing the initial mapping comprises mapping rows of data in a table.

20. The computer-implemented method of claim 19, wherein:
the copying of the data share comprises using a SQL INSERT INTO SELECT statement.

21. A non-transitory computer-readable medium storing computer instructions for accessing data, that when executed by one or more processors, cause the one or more processors to perform the steps of:
providing an initial mapping which maps data in a storage device to a first plurality of caches, wherein each first cache among the first plurality of caches is mounted to a respective first processor in a first plurality of cache-processor pairs to allow the respective first processor to access the first cache without making a network call, the first plurality of cache-processor pairs are arranged in a plurality of computing nodes with at least one cache-processor pair per computing node, and each first cache among the first plurality of caches copies a data portion of the data from the storage device based on the initial mapping and using a network call;
changing a number of the computing nodes, the changed number of computing nodes comprise a second plurality of caches, each second cache among the second plurality of caches is mounted to a respective second processor in a second plurality of cache-processor pairs to allow the respective second processor to access the second cache without making a network call, the second plurality of cache-processor pairs are arranged in the changed number of computing nodes with at least one cache-processor pair per computing node;

providing a modified mapping in response to the change, the modified mapping maps data in the storage device to the second plurality of caches;

for at least one second cache, taking a data share of the data which is mapped to a first cache in the initial mapping, the taking of the data share comprises copying the data share from the storage device based on the modified mapping and using a network call without transferring the data share from the first cache to the at least one second cache; and passing queries to the computing nodes, the computing nodes respond to the queries using data stored in the caches.

22. The non-transitory computer-readable medium of claim 21, wherein:

the providing the initial mapping comprises mapping rows of data in a table.

23. The non-transitory computer-readable medium of claim 21, wherein the computer instructions for accessing data, when executed by one or more processors, cause the one or more processors to perform the further step of:

shutting off the plurality of computing nodes and subsequently powering on the plurality of computing nodes while data which is mapped to the plurality of computing nodes remains in the plurality of computing nodes.

* * * * *